United States Patent [19]
Farr

[11] 3,811,538
[45] May 21, 1974

[54] BRAKE ADJUSTERS
[75] Inventor: Glyn Phillip Reginald Farr, Kenilworth, England
[73] Assignee: Girling Limited, Birmingham, England
[22] Filed: Mar. 19, 1973
[21] Appl. No.: 342,359

[30] Foreign Application Priority Data
Mar. 23, 1972  Great Britain.................... 13563/72

[52] U.S. Cl...................... 188/79.5 GE, 188/196 D
[51] Int. Cl............................................ F16d 65/56
[58] Field of Search........ 188/71.9, 79.5 GE, 196 F, 188/196 D

[56] References Cited
UNITED STATES PATENTS
3,442,357  5/1969  Farr ................................ 188/196 D
3,680,664  8/1972  Farr ................................ 188/196 D
3,757,906  9/1973  Baezold ......................... 188/196 D Primary Examiner—Duane A. Reger
Attorney, Agent, or Firm—Scrivener Parker Scrivener & Clarke

[57] ABSTRACT

A slack adjuster for a drum or disc brake has a housing, preferably in the form of a cylinder body; a first member, preferably a hydraulic piston, slidable in the housing and a second or strut member normally resting against a stop in the housing. A non-reversible screw-threaded connection between the first and second members comprises an internal thread on the former and an external thread on the latter. The adjuster includes a screw member fixed relative to the housing and a drive ring member. A reversible screw-thread connection is formed by an external thread on the screw member and an internal thread on the drive ring member. Mating clutch surfaces are provided on the second member and the drive ring and are normally urged towards one another. The normal brake slack is accommodated by axial clearance, preferably at the reversible screw-thread connection. When lining wear has taken place the axial clearance is taken up and slight rotation occurs at the reversible screw-thread. Upon brake release, slight rotation occurs in the opposite direction and this is transmitted to the non-reversible screw-thread connection via the clutch surfaces.

21 Claims, 10 Drawing Figures

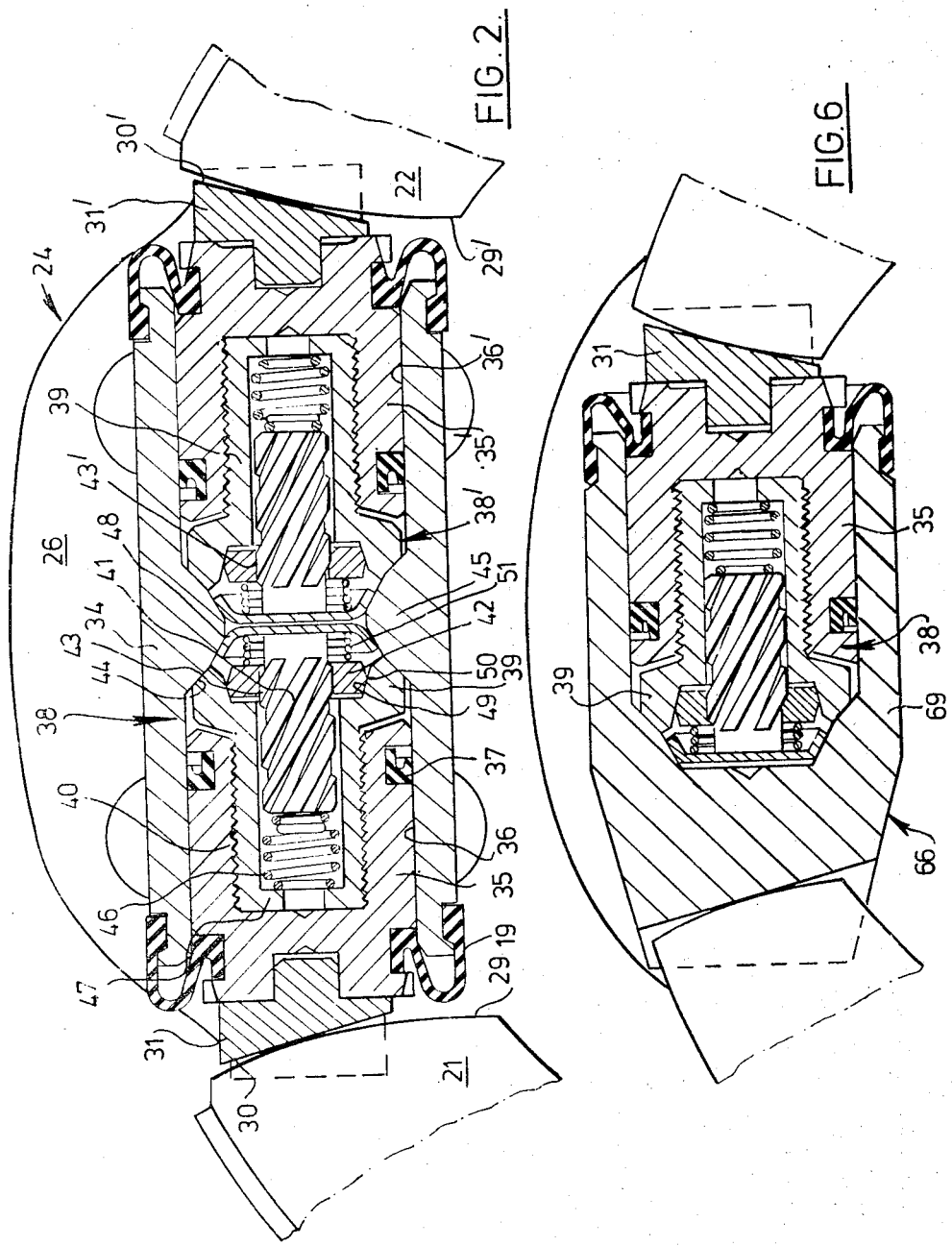

BRAKE ADJUSTERS

This invention relates to brake assemblies and in particular to slack adjusters for brake assemblies of the kind comprising a rotor, a brake element engageable with the rotor, and a normally non-rotatable tappet member slidable in a housing and operative to move the braking element into braking engagement with the rotor.

The invention is applicable to disc brakes and to internal shoe drum brakes actuated mechanically or hydraulically.

A problem with such brake assemblies is to provide reliable automatic adjustment of the position of the tappet member relative to the housing to compensate for wear of the brake element. To operate reliably throughout the wear life of the brake element, the adjuster member needs to be sealed from corrosion, freed from side loading during normal brake applications, and freed from full clamp loading during adjustment.

According to the present invention, a slack adjuster for a brake system comprises a housing, a first member slidable in said housing and having an internal screw-thread, a second member having an external screw-thread mating with said internal thread to form a non-reversible screw-thread connection, said second member having a normal resting position in which it lies against a stop in said housing, the second member being rotatable relative to said first member to adjust the axial resting position of the first member relative to the housing, a screw member axially and rotatably fixed relative to said housing, and a drive ring member having an internal screw-thread mating with an external screw-thread on the screw member to form a reversible screw-thread connection, said second member and said drive ring member having mating clutch surfaces urged toward one another, the normal brake slack being accommodated by axial lost-motion clearance provided at at least one of said screw-thread connections.

If adjustment is required to compensate for excessive wear of the brake element which has occurred either during the brake application or as a result of previous brake applications, then when the assembly is actuated during a brake application the permitted axial lost-motion is exceeded and slight rotation occurs at the reversible screw-thread connection in dependence upon the amount of excess axial movement; whilst upon subsequent relaxation of braking, rotation occurs at the non-reversible screw-thread connection to effect automatic adjustment of the outward position of the first or tappet member relative to the second member which acts as a strut, and thus relative to the housing stop.

A reversible screw-thread connection between two members is a connection such that axial displacement of one member causes rotation of the other member and *vice versa* whereas a non-reversible screw-thread connection between two members is one in which an axial force applied to one member cannot normally cause relative rotation between the members. Whether a screw-thread connection is reversible or not depends upon the pitch and flank angles of the thread and the coefficient of friction between the members.

Preferably the reversible screw-thread connection used in the slack adjuster of the present invention has at least three starts.

In one practical arrangement the drive ring is resiliently biassed towards engagement with the clutch surface on the second member; and the lost-motion is provided in the reverisble screw thread connection. Conveniently the tappet member and the strut member are both cup-shaped, the screw member being received with clearance in the strut member, a control spring acting between the end of the screw member and the base of the strut member. The screw member is thus urged outwardly of the housing, whilst the tappet member is normally urged inwardly as by brake element return springs, so ensuring engagement between the respective flanks of the non-reversible screw thread connection.

In a preferred arrangement the first or tappet member is a hydraulic piston carrying an annular hydraulic seal acting against the internal bore of the housing, the hydraulic seal helping prevent rotation of the tappet member or piston within the housing.

The stop can be an annular internal collar in the housing and having first and second conical surfaces against which respectively normally seat the strut member and an integral head on the screw member.

In an internal shoe drum brake, a double-ended housing may be used, with identical strut and tappet members, and screw and drive ring members to either side of a single internal annular stop, and the housing being located between one pair of adjacent shoe tip ends. Between the other pair of shoe tip ends there may be provided for instance an identical double-ended housing giving a fully automatically adjusted "two leading shoe" brake assembly, for both directions of drum rotation, or alternatively a double-ended hydraulic actuator or a "roller expander," without adjustment. In yet a further embodiment there can be a thrust transmission strut of known design between the other pair of shoe tip ends giving a "duo-servo" brake assembly, the housing stop acting as the abutment arresting shoe movement during braking.

In a further internal shoe drum brake construction, two separate single-ended housings according to the invention can be provided, one housing being located between each of the pairs of adjacent shoe tip ends, an external surface of the housing acting as the abutment for the non-actuated shoe tip end.

In a disc brake, single-ended and double-ended housings according to the invention may replace known single-ended and double-ended units.

The invention will be further described, by way of example, with reference to the accompanying drawings, in which:

FIG. 2 is a longitudinal sectional view of the brake actuator and slack adjuster unit;

FIG. 6 is a longtiudinal section of the actuator and adjuster unit of FIG. 5;

Figure 1:
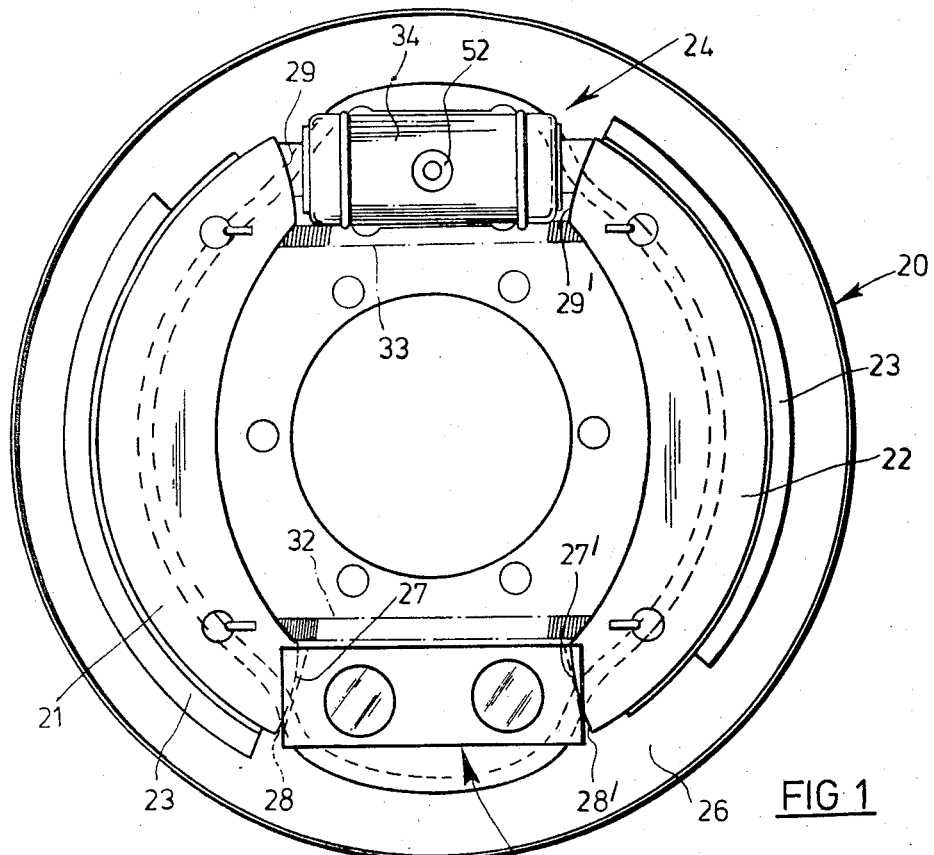
FIG. 1 is an elevation of a brake assembly fitted with a slack adjuster in accordance with the present invention.

FIG. 1 of the drawings shows an internal shoe drum brake 20 comprising two opposed brake shoes 21 and 22 provided with friction linings 23 which cooperate with the drum (not shown). An actuator and adjuster unit 24 cooperates with the upper ends of the brake shoes 21, 22, and an abutment unit 25 fixed to a backplate 26 cooperates with the lower ends of the shoes 21, 22. The lower ends of the shoes 21 and 22 are provided with arcuate surfaces 27, 27' which cooperate with inclined abutment surfaces 28, 28' on the abutment unit 25. The upper ends of the brake shoes 21, 22 have arcuate surfaces 29, 29' cooperating with inclined surfaces 30, 30' on thrust members 31, 31' as shown in FIG. 2. Return springs 32, 33 in the form of coiled tension springs cooperate with the lower and upper ends of the brake shoes 21, 22 to hold the surfaces 27, 27', 29, 29' against the surfaces 28, 28', 30, 30'.

FIG. 2 shows the actuator/adjuster unit 24 in detail. This unit comprises a housing or cylinder body 34 fixed to the backplate 26. Pistons 35, 35' are slidable in cylinder bores 36, 36' in the cylinder body 34 and are sealed thereto by sealing rings 37. The thrust members 31, 31' are mounted on the outer ends of the pistons 35, 35'. Rubber boots 19 surround the outer ends of the pistons 35, 35' and the cylinder body 34 to prevent the ingress of dirt and moisture into the interior of the cylinder body.

Inasmuch as the unit 24 is symmetrical about its vertical centre line, the following description relates only to the lefthand side of the unit; parts of the identical righthand unit are denoted by similar reference numerals, but with the addition of a prime.

The piston 35 forms a non-rotatable member of a slack adjuster 38 which includes a second rotatable member 39 having an external screw-thread meshing with an internal screw-thread in the piston 35 to form a non-reversible screw-thread connection 40. The adjuster mechanism 38 includes a screw 41 having an external screw-thread meshing with an internal screw-thread in a drive ring 42 to form a reversible screw-thread connection 43 of the same hand as the non-reversible screw-thread connection 40.

The brake return spring 33 (FIG. 1) normally urges the second member 39 against an inclined abutment surface 44 on a stop 45 formed as an internal collar inside the cylinder body 34. A light spring 46 acts between an internal flange 47 in the second member 39 and the lefthand end of the screw 41 to urge a head 48 on the latter against the stop 45 to prevent axial movement and rotation of the screw 41. The second member 39 is made hollow to receive the shank of the screw 41 and the spring 46 and is provided with an internal conical friction surface 49 which cooperates with a complementary external conical friction surface 50 on the drive ring 42. The drive ring 42 is made for convenience with a similar, but oppositely directed, conical friction surface so that the drive ring can be fitted either way round in the adjuster mechanism. A compression spring 51 acts between the drive ring 42 and the head of the screw 41 to hold the friction surfaces 49, 50 in frictional engagement with one another to form a friction clutch.

If it is supposed that the brake of FIG. 1 is operated with the drum rotating anti-clockwise, the brake shoe 21 becomes a leading shoe and the brake shoe 22 becomes a trailing shoe. The brake is applied by supplying hydraulic fluid thereto through a port 52 in the wall of the cylinder body 34 to urge the pistons 35, 35' to the left and right, respectively, against the upper ends of the brake shoes 21, 22. Axial clearance is provided at the reversible screw-thread connections 43, 43' to accommodate the normal axial travel of the pistons 35, 35' when no adjustment is required. As the piston 35 is moved to the left by the hydraulic fluid, it takes with it the second member 39 and the spring 51 causes the drive ring 42 to follow the second member. Should lining wear take place while the brake is applied, the piston 35 moves slightly further to the left but as the axial clearance at the reversible screw-thread connection 43 is more than taken up, the screw 41 tends to hold back the drive ring 42. However, under the influence of the spring 51 the reversible screw-thread connection 43 rotates the drive ring 42 while slipping takes place at the friction surfaces 49, 50. When the brake is released the piston 35 is returned to the right by the return spring 33 and the axial clearance to the reverisble screw-thread connection 43 is again fully taken up before the second member 39 engages the abutment surface 44. The conical friction surfaces 49, 50 now prevent the drive ring 42 from turning relative to the second member 39 so that the reverisble screw-thread connection 43, in turning the drive ring 42, also turns the member 39 to effect adjustment at the non-reversible screw-thread connection 40 to compensate for the lining wear. Since the pitch angle of the reversible screw-thread connection 41 is substantially greater than that of the non-reversible screw-thread connection 40, several brake operating and release cycles are necessary for the member 39 to be unscrewed sufficiently to substantially completely compensate for the lining wear. In other words, the adjuster mechanism 38 is a so-called "incremental adjuster."

While the adjustment operation has been described with reference to the lefthand adjuster mechanism 38, precisely the same adjustment operation takes place with the righthand adjustment adjuster mechanism 38' to compensate for wear of the lining of the trailing shoe 22.

It will be noted that, because in the resting position of the brake the spring 33 holds the arcuate surface 29 on the upper end of the shoe 21 against the inclined surface 30, and thereby holds the member 29 against the stop 45, the conical abutment surface 44 on the stop 45 acts as a friction surface preventing reverse rotation of the second member 39.

The brake could be provided with an auxiliary mechanical actuator which acts between the stop 45 and the second members 39, 39', or which acts between abutment unit 25 and the lower ends of the brake shoes 21 and 22.

Figure 3:
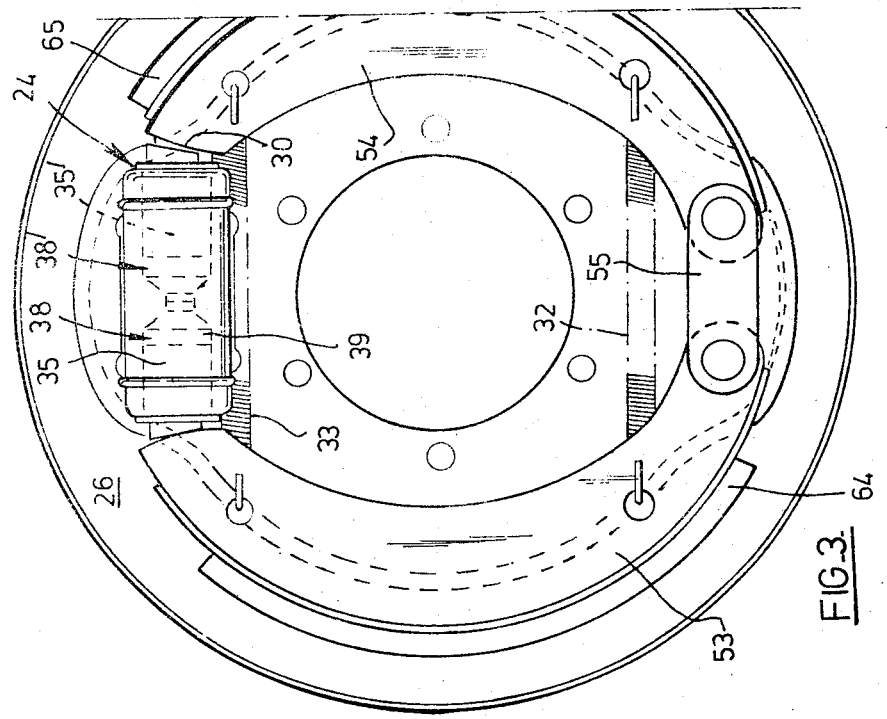
FIG. 3 is an elevation of a second embodiment of brake assembly fitted with the actuator and slack adjuster unit of FIG. 2.

The brake assembly of FIG. 3 also employs the actuator and adjuster unit 24 (shown in FIG. 2 of the drawings) mounted on the backplate 26 and between the upper ends of the brake shoes 53 and 54, but the lower ends of the brake shoes are joined by a thrust transmission strut 55. The brake assembly of FIG. 3 is thus a so-called "duo-servo" for both anticlockwise and clockwise directions of rotation because both brake shoes become leading shoes. For clockwise rotation of the drum (not shown) the shoe 53 is applied by the piston 35 and the shoe 54 is applied by thrust transmitted to the lower end of the shoe 54 from the lower end of the shoe 53 via the strut 55. The piston 35' cannot move because the reaction applied by the upper end of the shoe 54 is greater than the force applied by the piston 35 to the shoe 53. The piston 35' thereby acts as a fixed abutment for anti-clockwise rotation.

During brake actuation with anti-clockwise rotation the piston 35 carries with it the second member 39 so that automatic adjustment of the adjuster mechanism 38 can be effected when lining wear takes place. However, the adjuster mechanism 38' cannot operate because the piston 35' does not move. The converse is true for clockwise rotation of the drum, i.e. the piston 35' operates the brake and the adjuster mechanism 38' can effect automatic adjustment reponsively to lining wear during clockwise rotation.

Brake return springs 32, 33 are provided as in the preceding embodiment.

Figure 4:
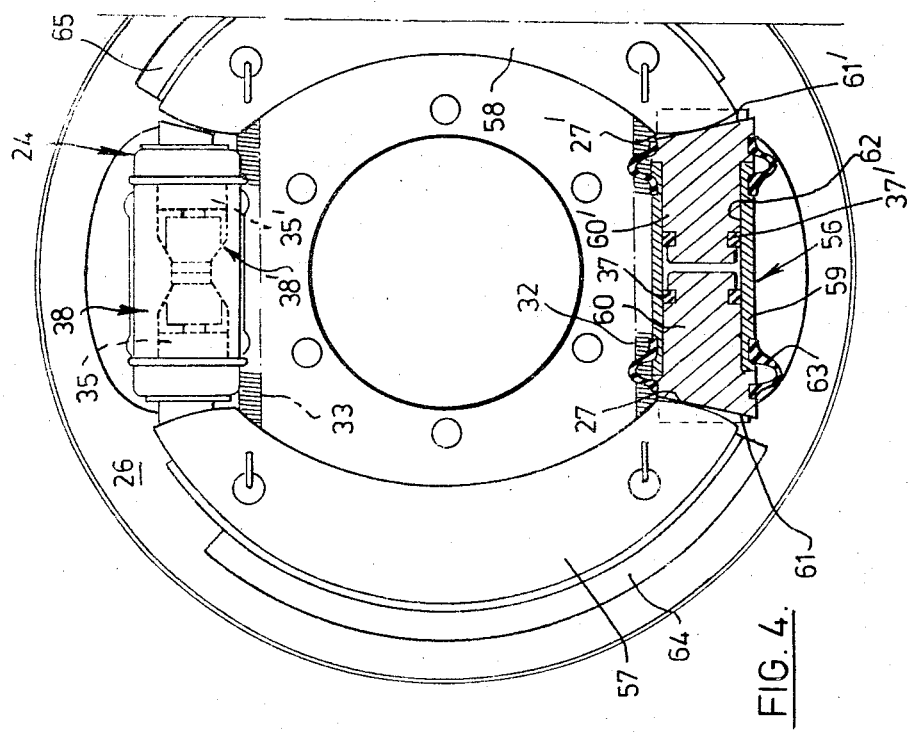
FIG. 4 is an elevation of a third embodiment of brake assembly fitted with the actuator and slack adjuster unit of FIG. 2.

The embodiment of brake assembly shown in FIG. 4 again includes the actuator and adjuster unit 24 mounted on the backplate 26 and as shown in FIG. 2. In FIG. 4 an actuator unit 56 mounted on the backplate 26 is also provided to act on the lower ends of the brake shoes 57 and 58. The actuator unit 56 comprises a cylinder body 59 in which opposed pistons 60 and 60' are slidable. The pistons 60, 60' abut by inclined surfaces 61, 61' against the arcuate lower ends 27, 27' of the brake shoes 57, 58. The pistons 60, 60' are sealed to the bore 62 in the cylinder body by sealing rings 37 and protective boots 63 are provided as in FIG. 2. The brake system of FIG. 4 is thus also a "two leading shoe brake" for both directions of rotation, but the lower actuator unit 56 is not provided with adjuster mechanisms. The pistons 35 and 60' are operative for anticlockwise drum rotation and the pistons 35' and 60 and the adjuster mechanism 38' are operative for clockwise drum rotation. It will be noted that the pistons 60, 60' are provided with abutment faces to limit inward movement of these pistons into the cylinder body 59 so that one or other of these pistons can act as a fixed abutment depending upon the direction of drum rotation.

As in the preceding embodiments brake return springs 32, 33 are provided at the upper and lower ends of the brake shoes.

It will be noted that in the leading shoe arrangements of FIGS. 3 and 4 the linings 64 and 65 are applied to the shoes 53, 57, 54, 58 unsymmetrically to enhance the servo effect in well known manner.

Figure 5:
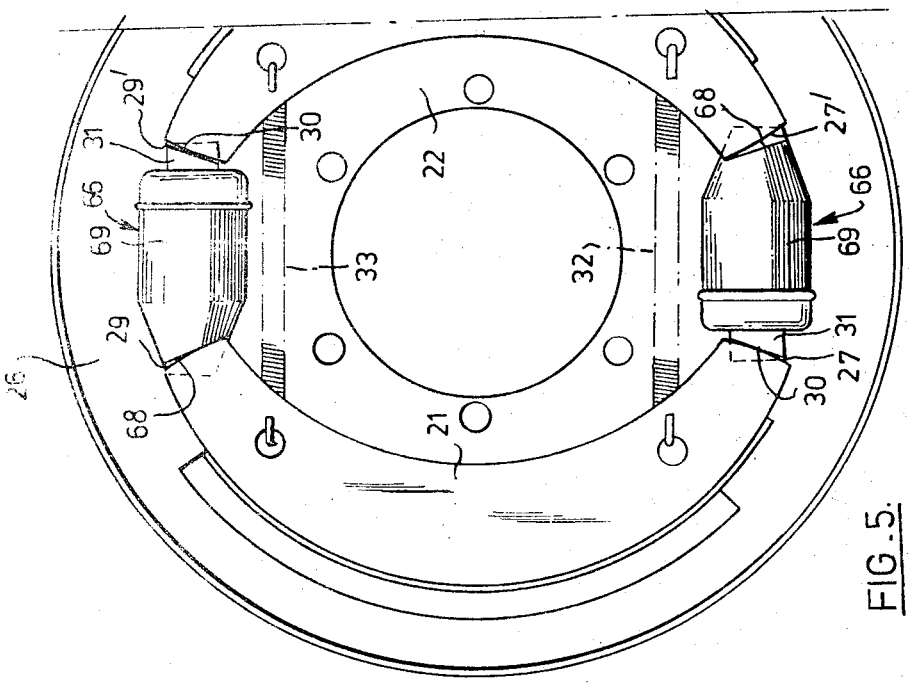
FIG. 5 is an elevation of a brake assembly fitted with another embodiment of actuator and slack adjuster unit in accordance with the invention.

The brake assembly shown in FIG. 5 is somewhat different from those of the preceding figures in that it comprises a pair of actuator and adjuster units 66 fixed to the backplate 26. The upper end of the lefthand shoe 21 has an arcuate surface 29 which cooperates with an inclined abutment surface 68 formed on the cylinder body 69 of the upper actuator/adjuster unit 66. The upper end of the brake shoe 22 has an arcuate surface 29' which cooperates with an inclined surface 30 on a thrust member 31. The brake shoes 22 and 21 likewise have at their lower ends arcuate abutment surfaces 27' at 27 which cooperate respectively with inclined abutment surfaces 68 and 30 on the cylinder body 69 and the thrust member 31 of the lower actuator/adjuster unit 66. Retraction springs 32, 33 are provided at the upper and lower ends of the brake shoes as before.

One of the actuator/adjuster units 66 is shown more fully in FIG. 6, from which it will be seen that the unit comprises a piston 35 acting on the thrust member 31, and an adjuster mechanism 38 exactly as in the embodiment of FIG. 2. The adjuster mechanism 38 of FIG. 6 is constructed and operates in exactly the same way as that of FIG. 2 and the description, therefore, will not be repeated.

The shoes 21, 22 of FIG. 5 thus both act as leading shoes for clockwise rotation of the drum and as trailing shoes for anti-clockwise rotation. Automatic adjustment can take place responsibely to lining wear in each of the actuator adjuster mechanisms 66 for either direction of rotation in the same manner as described above.

If desired, a mechanical actuator (handbrake) could act between the cylinder body 69 and the member 39 in FIG. 6.

FIGS. 7 to 10 of the drawings illustrate the invention as applied to a brake assembly having a "roller expander" actuator 70 operative between the upper ends of the brake shoes 71, 72 and an actuator and adjuster unit 73 operative between the lower ends of the brake shoes. The embodiment of FIGS. 7 to 10 is thus a "two leading shoe brake" for both directions of rotation in the same way as the embodiment of FIG. 4, but the adjuster mechanisms are provided in the lower actuator unit.

Figure 8:
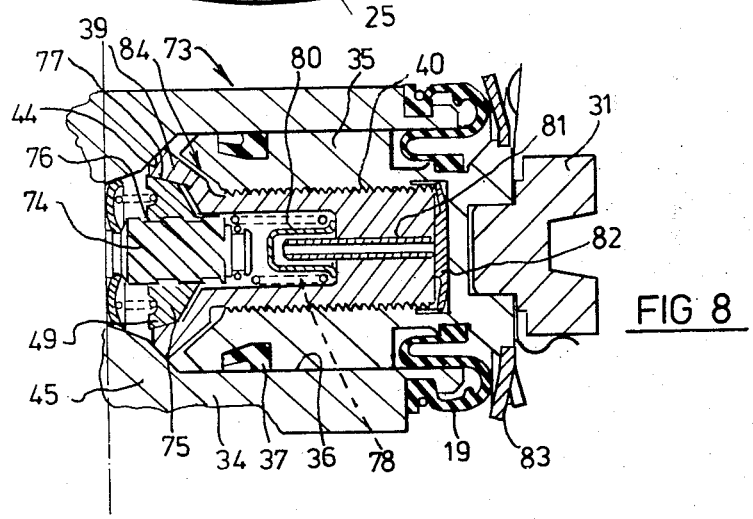
FIG. 8 is a longitudinal section of part of the slack adjuster and actuator unit of the assembly of FIG. 7.
Figure 7:
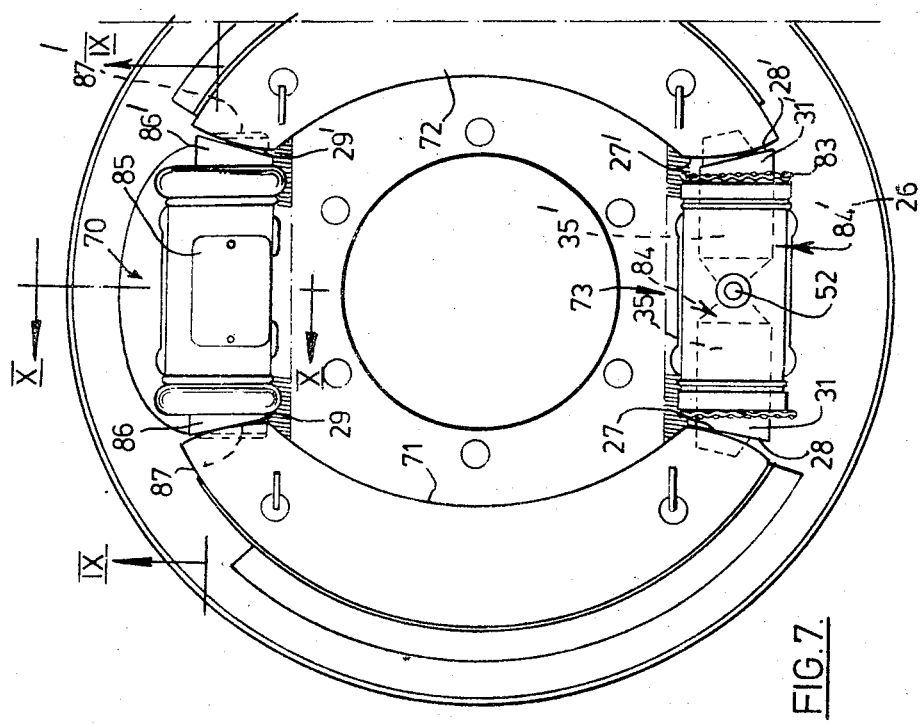
FIG. 7 is an elevation of yet another embodiment of brake assembly fitted with an actuator and slack adjuster in accordance with the invention.

FIG. 8 is a section of part of the actuator/adjuster unit 73, it being understood that the unit 73 is symmetrical about its vertical centre line in the same way as the unit 24 shown in FIG. 2. The unit 73 is very much like the unit 24 and comprises pistons 35 slidable in corresponding bores 36 in the cylinder body 34 which is fixed to the backplate 26 (FIG. 7). Each member 39 has a non-reversible screw-thread connection 40 with its respective piston 35 and cooperates with a conical abutment surface 44 on the stop 45 formed inside the cylinder body 34. The screw 74 of FIG. 8, however, is rather smaller than the screw 41 of FIG. 2 and the drive ring 75 having the reversible screw-thread connection 76 with the screw 74 is of a somewhat different shape. The drive ring 75 cannot be turned round during assembly since it only has one external conical friction surface 77 mating with the internal conical friction surface 49 in the member 39. Also, the light spring 78 acting between the screw 74 and the second member 39 is rather smaller and is provided with a cup-shaped guide member 80. A tube 81 extends axially through the member 39 and a spacer 82 is provided at the inner end of the piston 35 to assist in bleeding the brake. A castellated washer 83 is provided on the outer end of the piston 35 and serves to protect the boot 19 and also enables the piston 35 to be readily turned for re-setting the adjuster after lining replacement. A seal 37 seals the piston 35 to the bore 36.

The adjuster mechanism 84 of FIG. 8 operates in exactly the same way as the mechanism 38 of FIG. 2.

As shown in FIG. 7 inclined surfaces 28, 28' on the thrust members 31, 31' cooperate with arcuate surfaces 27, 27' on the lower ends of the brake shoes 71, 72.

Figure 9:
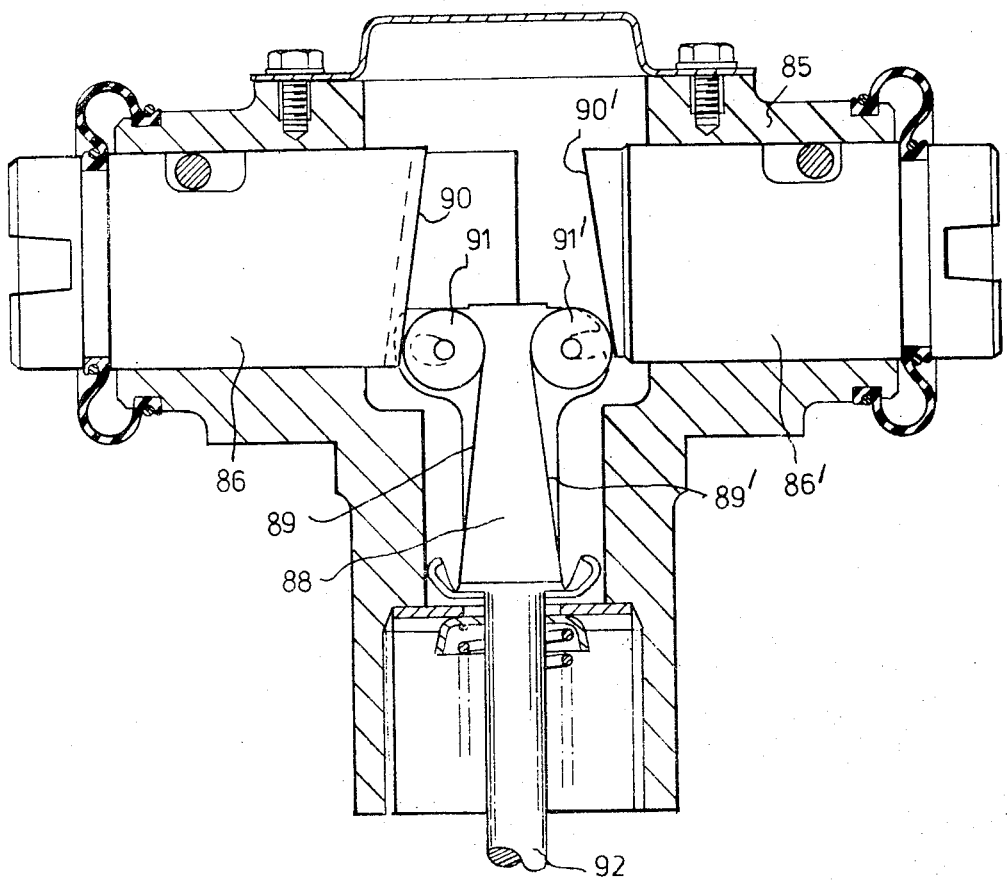
FIG. 9 is a section on the line IX—IX of FIGS. 7 and 10 showing a "roller expander" of the assembly of FIG. 7.
Figure 10:
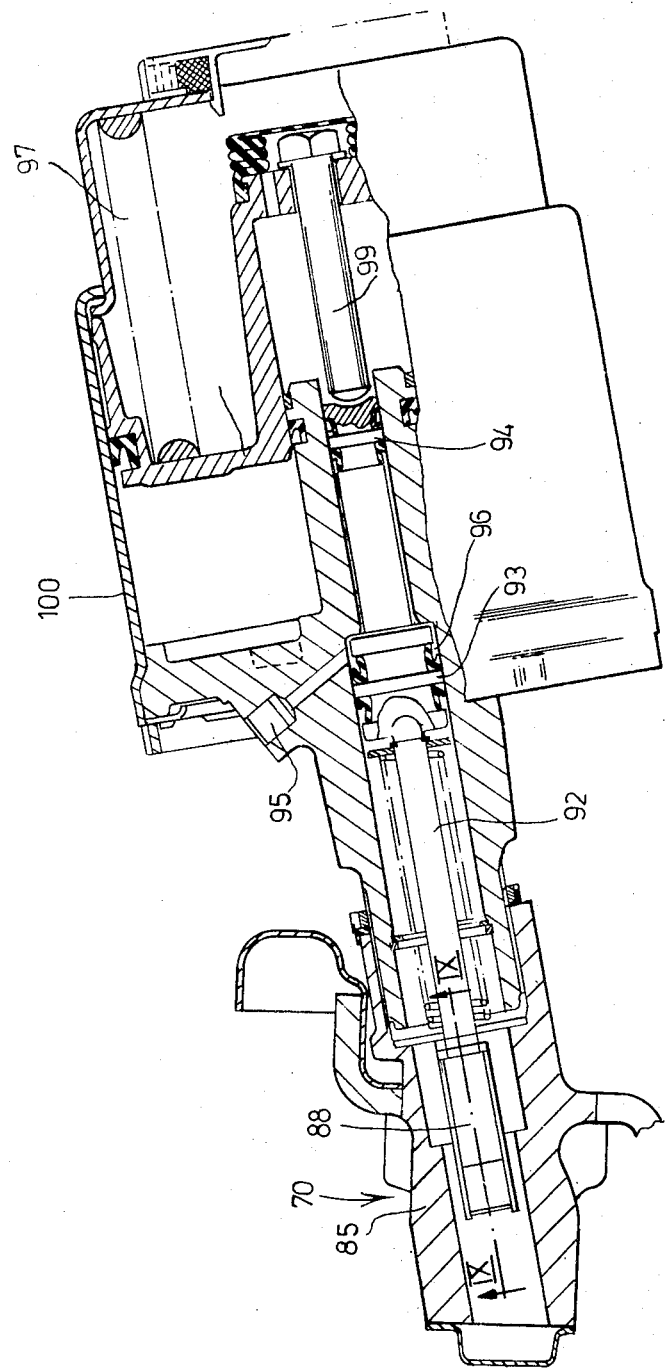
FIG. 10 is a sectional view on the line X—X of FIG. 7.

The roller expander unit 70 is shown in more detail in FIGS. 9 and 10. It comprises a housing 85 fixed to the backplate 26 and opposing tappets 86, 86' provided with inclined surfaces 87, 87' which cooperate with the arcuate surfaces 29, 29' at the upper ends of the brake shoes 71, 72. A ramp member 88 is provided with opposed ramp faces 89, 89' which cooperate with complementary ramp faces 90, 90' on the tappet members 86, 86' via rollers 91, 91'. Thus, upward movement of the ramp member 88 into the space between the tappet members 86, 86' urges these tappet members apart.

The ramp member 88 is attached to the free end of a piston rod 92 which is provided with a larger diameter piston 93 and a smaller diameter piston 94. Hydraulic fluid applied via a port 95 to the annular chamber 96 between the pistons 93 and 94 thereby urges the piston rod 92 to the left in FIG. 10 to push the ramp member 88 between the tappet members to urge the upper ends of the brake shoes apart.

For parking, a heavy spring 97 acting on a piston 98 urges the piston rod 92 to the left to apply the brake mechanically. To release the brake compressed air is supplies to an air cylinder 100, in which the piston 98 is slidable, to push the piston 98 to the right, thereby compressing the spring 97.

The brake of the embodiment of FIGS. 7 to 10 is operated hydraulically by simultaneously applying fluid to the port 95 of the upper actuator and to the port 52 of the lower actuator. The diameters of the piston 35 and the pistons 93 and 94 are so chosen in relation to the angle of the ramp surfaces 89, 90 that equal braking forces are applied to the upper and lower ends of the brake shoes 71, 72 during hydraulic operation.

As with the embodiment of FIG. 4 the piston 35, the tappet member 86' and the adjuster mechanism 84 are operative for clockwise rotation of the drum, and the piston 34', the tappet member 86 and the adjuster mechanism 84' are operative for anti-clockwise rotation.

In the embodiments of FIGS. 4, 5 and 7 in which two separate hydraulic actuators are employed, the actuators may be supplied from separate sources as in a dual-hydraulic braking system, or may be supplied from a common source.

I claim:

1. A slack adjuster for a brake system comprising in combination: a housing; a first member slidable in said housing and having an internal screw-thread thereon; a second member having thereon an external screw-thread mating with said internal thread to form a non-reversible screw-thread connection; a stop in said housing, said second member having a normally resting position in which it lies against said stop in said housing, said second member being rotatable relatively to said first member to adjust the axial resting position of said first member relative to said housing; a screw member axially and rotatably fixed relative to said housing and having an external screw-thread thereon; a drive ring member having thereon an internal screw-thread mating with the last-mentioned external thread to form a reversible screw-thread connection; and mating clutch surfaces on said second member and said drive ring member, said mating clutch surfaces being urged towards one another, the normal brake slack being accommodated by axial clearance provided at at least one of said screw-thread connections.

2. A slack adjuster according to claim 1 further comprising means resiliently biassing said drive ring member against said clutch surface on said second member.

3. A slack adjuster according to claim 2 in which said resilient bias means comprises a compression spring disposal between said screw and drive ring members.

4. A slack adjuster according to claim 1, in which said clutch surfaces comprise conical friction surfaces.

5. A slack adjuster according to claim 1 in which said reversible screw-thread connection has axial clearance at which the normal brake slack is accommodated exclusively.

6. A slack adjuster according to claim 5 further comprising resilient means biassing said second member to take up any axial clearance at said non-reversible screw-thread connection.

7. A slack adjuster according to claim 6 in which said resilient means is operative between said second and screw members and serves to hold said screw member in a fixed position relative to said housing.

8. A slack adjuster according to claim 1 further comprising resilient means biassing said screw member to hold said screw member in a fixed position relative to said housing.

9. A slack adjuster according to claim 8 in which said screw member is biassed by said resilient means against said housing stop to prevent rotation and axial displacement of said screw member relative to said housing.

10. A slack adjuster according to claim 1 in which said housing comprises a hydraulic actuator cylinder body having a cylinder bore and said first member comprises an actuator piston slidable in said cylinder bore.

11. A slack adjuster according to claim 10 in which said stop comprises an internal collar in said housing.

12. A slack adjuster according to claim 10 in which said cylinder body is double-ended and houses two said opposed hydraulic pistons and two said slack adjusters associated respectively with said pistons.

13. In a drum brake having a pair of brake shoes; a slack adjuster according to claim 12 in which said double-ended cylinder body is disposed between adjacent ends of said pair of brake shoes, each said piston acting on a respective brake shoe end.

14. A slack adjuster according to claim 13 which comprises fixed abutments for the other brake shoe ends.

15. A slack adjuster according to claim 13 which comprises a strap interconnecting the other brake shoe ends.

16. A slack adjuster according to claim 13 which comprises a further actuator acting between the other brake shoe ends.

17. A slack adjuster according to claim 16 in which said further actuator comprises a hydraulic actuator having opposed pistons operative respectively on said other brake shoe ends.

18. A slack adjuster according to claim 16 in which said further actuator comprises a "roller-expander."

19. A slack adjuster according to claim 18 which further comprises hydraulic cylinder and piston means for operating said "roller-expander."

20. A slack adjuster according to claim 18 which further comprises a brake spring for operating said "roller-expander" and a fluid-operated piston for compressing said brake spring to release said "roller-expander."

21. In a drum brake having a pair of brake shoes: a slack adjuster according to claim 10 in which said cylinder body is disposed between adjacent ends of said pair of brake shoes and said actuator piston acts on said end of one brake shoe while the cylinder body acts as a fixed abutment for said end of the other brake shoe, and another hydraulic cylinder body containing an actuator piston and another said slack adjuster associated therewith disposed in like manner between the other ends of said brake shoes.

* * * * *